March 25, 1958 S. WEIMERSHEIMER 2,827,794
HAND-POWERED MOTOR FOR UNI-DIRECTIONAL IMPLEMENTS
Filed Nov. 8, 1954 3 Sheets-Sheet 1

INVENTOR:
Samuel Weimersheimer
BY
Richardson, David and Nydon
ATTORNEYS.

March 25, 1958 S. WEIMERSHEIMER 2,827,794
HAND-POWERED MOTOR FOR UNI-DIRECTIONAL IMPLEMENTS
Filed Nov. 8, 1954 3 Sheets-Sheet 2
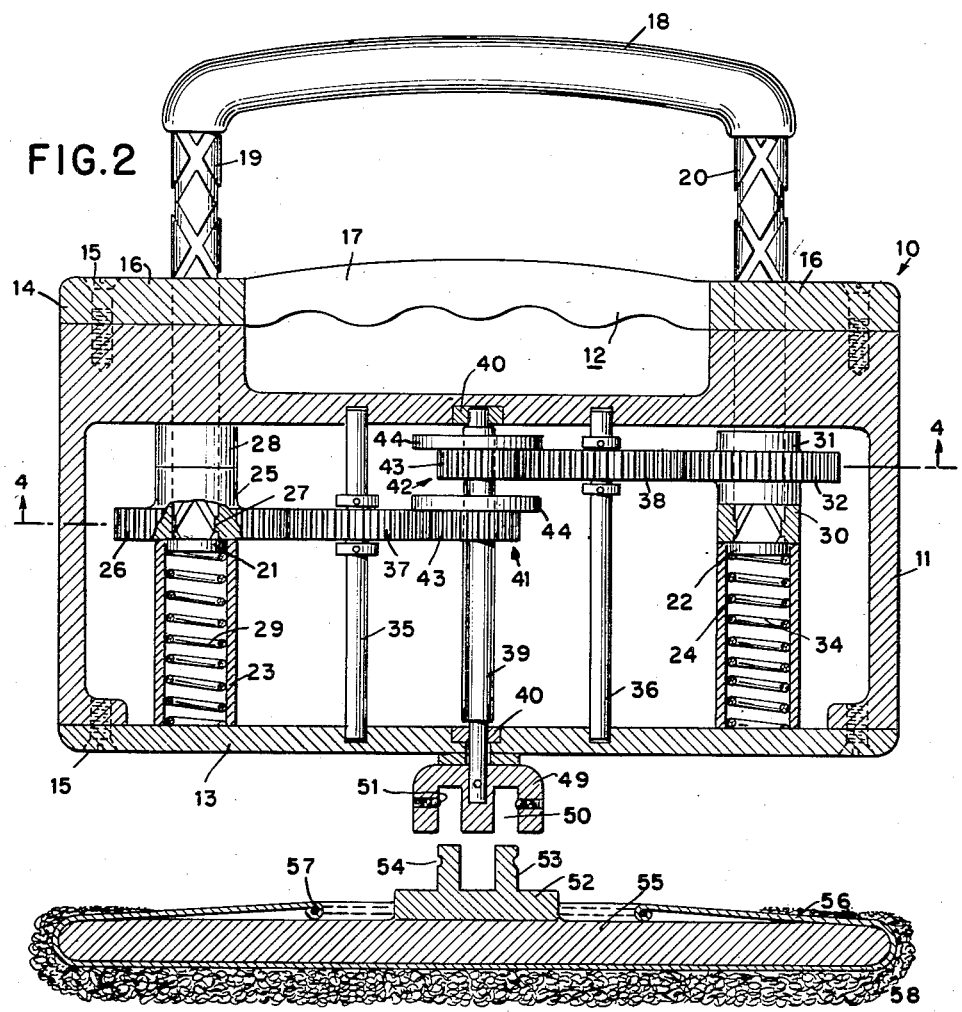
*INVENTOR:*
Samuel Weimersheimer
BY
Richardson, David and Nordon
ATTORNEYS.

March 25, 1958    S. WEIMERSHEIMER    2,827,794
HAND-POWERED MOTOR FOR UNI-DIRECTIONAL IMPLEMENTS
Filed Nov. 8, 1954    3 Sheets-Sheet 3

*INVENTOR:*
Samuel Weimersheimer
BY
Richardson, David and Nordon
ATTORNEYS.

United States Patent Office 2,827,794
Patented Mar. 25, 1958

2,827,794

HAND POWERED MOTOR FOR UNI-DIRECTIONAL IMPLEMENTS

Samuel Weimersheimer, Newark, N. J.

Application November 8, 1954, Serial No. 467,518

7 Claims. (Cl. 74—127)

The present invention relates to a novel implement for cleaning of cooking utensils and the like. More particularly, it relates to a novel drive for a scouring implement which may be actuated manually.

In the cleaning of cooking utensils such as pots and pans it is customary to employ abrasive materials such as steel wool and the like. The cutting qualities and harsh action of these materials though particularly suited for the operation desired have a deleterious effect on the hands. Moreover, scouring effected manually will be lent superficial, unless accompanied by a considerable and sustained physical effort. Moreover, certain vessels because of their shape may be too small for insertion of the whole hand and consequently they can be cleaned only partly or inefficiently.

Furthermore, the manual effort required for this purpose cannot be eliminated by adaptation of electrically powered motors in conventional manner because of the presence of water which presents a safety hazard.

An object of the invention is to provide drive means for powering a scouring implement which means avoid the hazards presented by the proximity of electrical circuits and water.

A still further object of the invention is to provide a manually actuated mechanism for driving a scouring pad.

These and other objects and advantages may be realized in accordance with the present invention, which will be described with reference to the accompanying drawings, in which—

Fig. 2 is a longitudinal section on an enlarged scale taken substantially along line 2—2 of Fig. 1, with parts thereof shown in section for explanatory purposes;

Fig. 3 is a perspective view of the scouring implement of Fig. 1;

Figure 1:
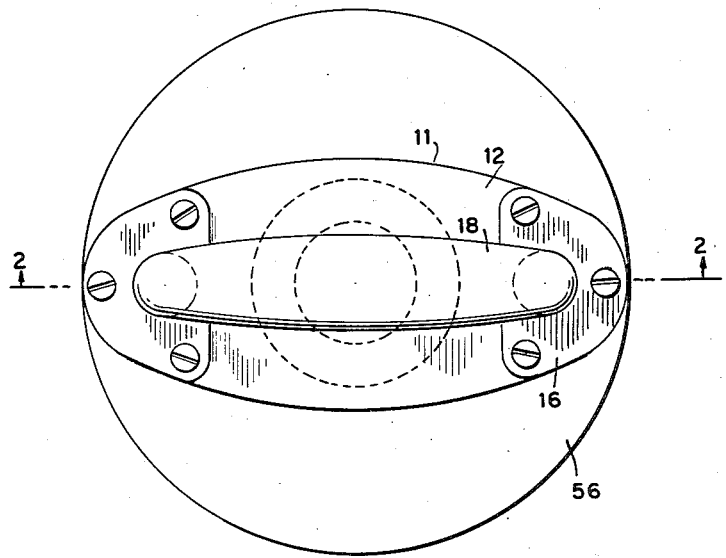
Fig. 1 is a top plan view of a scouring implement and the manually powered drive therefor, constructed in accordance with the present invention.

Referring now more particularly to Fig. 2, there is shown a housing 10 having a casing 11 provided with a recess 12, the housing further including a base 13 and a cover 14 held to the casing 11 by screws 15. The cover 14 includes a pair of end members 16 interconnected by a finger grasp 17 of undulated configuration, the latter overlying the recess 12.

A handle 18 overlies the finger grasp 17 and is normally spaced therefrom to such an extent that a person's fingers may encircle the finger grasp 17 while his palm rests on the handle 18. The handle carries a pair of spindles 19 and 20, the spindles being provided with helical cam grooves, i. e., Yankee screwdriver tracks. The spindles extend into the housing 10 through suitable openings in the cover 16 and in the casing 11, the spindles 19 and 20 terminating in collars 21 and 22, respectively.

The collar 21 is guided within a sleeve 23, secured to the base while the collar 22 is similarly guided in a sleeve 24.

An annular gear 25, provided with external teeth 26, seats on sleeve 23 about spindle 19 and includes internal teeth or followers 27 engaging in the tracks of the spindle. A spacer 28 maintains a predetermined distance between the casing 11 and the gear 25, thereby preventing the gear from being longitudinally displaced. Consequently, longitudinal displacement of the spindle by means of the handle 18 produces a rotary motion of the gear 25, the direction of rotation depending upon the direction of longitudinal movement.

A coiled spring 29 is disposed within the sleeve 23 and consequently opposes movement of the spindle 19; upon moving spindle 19 downwardly into the casing the spring 19 will automatically cause return movement of the spindle so that the gear 25 will be successively rotated in alternate directions.

At the right hand side of the casing spacer 30 rests on the sleeve 24 and supports gear 31, having external teeth 32 and internal teeth 33, at a different vertical elevation than gear 25. Within sleeve 24, a spring 34 is disposed to oppose longitudinal movement of the spindle 20 in the manner previously described.

Since the spindles 19 and 20 are interconnected by handle 18 and move simultaneously, gears 25 and 31 move simultaneously but in opposite directions.

Intermediate shafts 35 and 36 are rotatably supported between the casing 11 and the base 13 and have keyed or otherwise secured thereon gears 37 and 38, respectively positioned for engagement with teeth 26 and 32. As a result, longitudinal displacement of the handle towards or away from the housing produces rotary motion of gears 37 and 38 in opposite directions.

Figure 4:
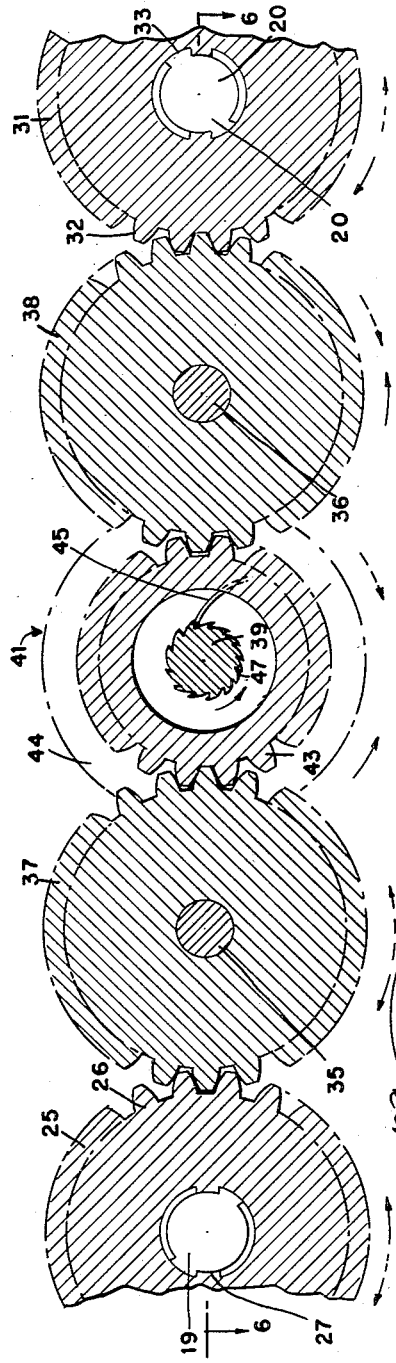
Fig. 4 is a sectional view on an enlarged scale taken along line 4—4 of Fig. 2.
Figure 5:
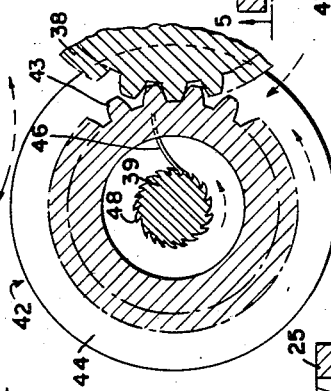
Fig. 5 is a fragmentary sectional view on a different scale taken along line 5—5 of Fig. 6.
Figure 6:
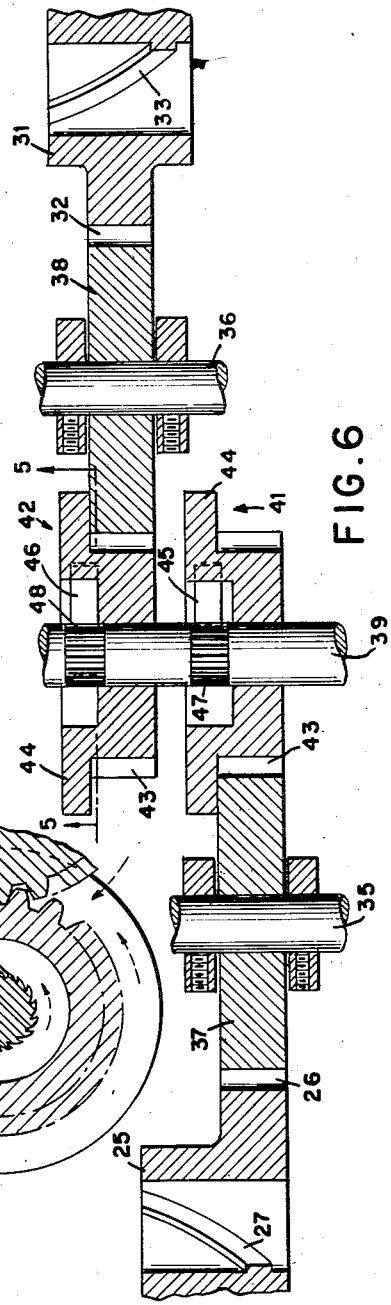
Fig. 6 is a fragmentary sectional view on an enlarged scale taken along line 6—6 of Fig. 4.

Approximately centrally disposed within the housing is a main driven shaft 39 extending through the base 13 and rotatably supported by bearings 40. A pair of stepped gears 41 and 42 are disposed about shaft 39. The stepped gears each include a toothed portion 43 meshing with a respective one of said intermediate gears, and a collar portion 44 which rides along a respective portion of the intermediate gears, thereby supporting the stepped gears. A resilient spring pawl extends inwardly of the collar portions 44, spring pawl 45 being connected with stepped gear 41 while spring pawl 46 is oppositely canted and connected with stepped gear 42 (Figs. 4 to 6).

At the appropriate elevation, i. e., opposite the spring pawls 45 and 46, the shaft 39 is provided with two sets of oppositely canted ratchet teeth 47 and 48, respectively. The end of the shaft 39 which extends exteriorly of the casing carries female lock member 49, the latter including a pair of grooves 50 and spring urged locking balls 51.

Male locking member 52 includes a pair of projections 53 complementary with grooves 50 of the female locking member, and a pair of indentations 54 complementary with the locking balls 51. The opposite face of the male locking member 52 is connected with a circular block 55 of wood or other material. A bag 56 of canvas or other fabric is provided with an elastic band 57 and is fitted over the block 55, the outer face of the bag having secured thereon a scouring material 58 such as steel wool, glass wool or a synthetic abrasive material.

The operation of the device is as follows:

Upon pushing the handle 18 downwardly gears 25 and 31 are rotated in opposite directions as indicated by the full arrows in Fig. 4. This produces rotation of gears 37 and 38 as indicated in full arrows, as well as rotation of gears 41 and 42. Spring pawl 45 of gear 41 cooperates with ratchet teeth 47 of shaft 39 to produce rotation of the shaft as indicated by the full arrow, while spring pawl 46 of gear 42 rides idly over ratchet teeth 48 of the shaft 39. Consequently, on the downward stroke shaft 39 is rotated in predetermined direction carrying the male and female locking members 49 and 52, respectively, therewith. Block 55 is also rotated to carry the scouring material 58 past the surface on which it rests for cleaning purposes.

Upon releasing or easing up on the handle 18, springs 29 and 34 tend to displace the spindles 19 and 20, respectively, in upward direction, thereby producing rotation of the gears in the directions indicated in dotted arrows in Figs. 4 and 5. In this cycle the gears are rotated in the reverse directions so that spring pawl 45 idles over ratchet teeth 47 while spring pawl 46 engages with ratchet teeth 48 and drives shaft 39 in the same direction as previously.

By working the handle 18 downwardly and releasing it alternately, the shaft 39 and scouring material 58 will be continuously rotated in the same direction.

In its essence, therefore, this embodiment comprises longitudinally reciprocable spindle means provided with a track for converting the longitudinal motion to a rotary motion of gear means. Through a pair of oppositely canted ratchets the gear means drives a shaft continuously in the same direction regardless of the direction of motion of the spindle means.

The specific configuration of the ratchet means may be varied and other equivalent structures may be substituted therefor, e. g., the disposition of the spring pawls and ratchet teeth with respect to the driven shaft and the ratchet gears may be transposed without changes in operation.

As can be seen in Fig. 1, the casing 11 is preferably elliptical in shape so that protection is afforded for the hand of the operator during use. Gears 37 and 38 are employed for gradually increasing the gear ratio between gears 25 and 31 on the one hand and shaft 39 on the other hand. Changes in the gear train may be made with corresponding changes in the canting of the spring pawls and the ratchet teeth, if necessary. Similarly, the length and shape of the block carrying the scouring material may be varied.

Figure 8:
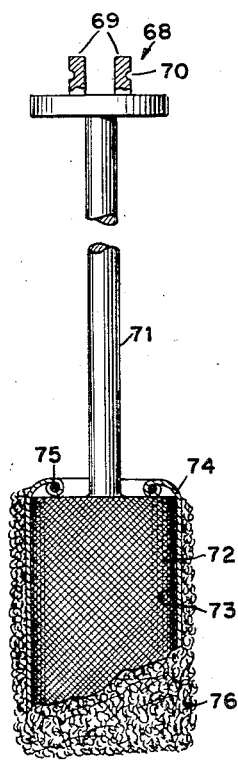
Fig. 8 is a side elevation of a modified scouring implement with a portion of the abrasive bag element removed to show the mounting thereof.

Fig. 8 relates to a modified scouring implement for use with the drive mechanism of Fig. 2, which implement is particularly adapted for cleaning of deep utensils having shallow openings, such as bottles and the like. The implement includes a male locking member 68 having projections 69 and indentations 70, similar to the male locking member 52. A lengthening rod 71 extends from the locking member 68 to a block 72, the external surface 73 of which is roughened or rasp-like. About the block 72 a canvas bag 74 is positioned, the bag being held on the block by an elastic band 75. Exteriorly of the bag 74 a scouring material 76, such as steel wool, is disposed. In operation, the male locking member 68 is coupled with the female locking member 49 for cleaning in the afore-described manner. The rasp-like surface 73 of the block 72 ensures that the canvas bag 74 will be carried about with the block through friction upon actuation of the drive shaft.

Figure 7:
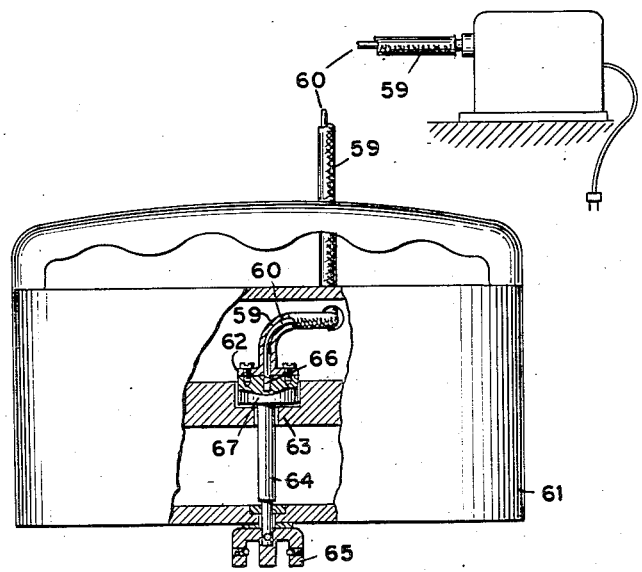
Fig. 7 is a schematic longitudinal section of an electrically powered scouring implement produced in accordance with the present invention.

In place of the manual powering of the driven shaft which in turn drives the scouring material, electrical means may be employed for this purpose provided certain safety measures are undertaken to prevent short circuiting of any electrical conductors by water used in the cleaning. Such an arrangement is shown schematically in Fig. 7.

Specifically, a sheath 59 surrounds a flexible shaft 60, which shaft is powered by an electric motor (not shown). The sheath extends into the implement housing 61 and terminates in a cap screw 62 threadedly engaging a sleeve 63, the sleeve serving as a guide for driven shaft 64 which projects exteriorly of the housing and terminates in a female locking member 65, similar to that described in reference to Fig. 2.

The flexible shaft 60 terminates in a projection 66 keyed to a corresponding recess 67 in one end of the shaft 64 so that actuation of the flexible shaft 60 produces rotation of shaft 64 for driving the scouring material previously described.

In this manner, it is possible to achieve the advantages of an electrically powered scouring implement while avoiding the hazards normally attendant the use of electricity in the vicinity of water. This is effected due to the fact that the electric energy is positioned remote from the driven shaft or any other part which comes near or in contact with water, the power being transmitted by means of a flexible shaft.

It will therefore be seen that variation in the drive means for the scouring material may be realized and, moreover, the drive means are further useful in powering other tools where a uni-directional drive is desired.

Various changes and modifications may be made without departing from the spirit and scope of the present invention and it is intended that such obvious changes and modifications be embraced by the annexed claims.

I claim:

1. A hand powered motor for uni-directional implements and accessories, comprising a housing, first annular gear means supported within said housing, spindle means extending into said housing and longitudinally displaceable in the annulus of said first gear means, said first gear means and said spindle means being provided with complementary track and follower means, whereby longitudinal displacement of said spindle means produces rotation of said first gear means, the direction of said rotation being determined by the direction of said longitudinal displacement, second gear means operatively connected with said first gear means and including a pair of annular second gears each rotated in different direction by said first gear means, driven shaft means extending from without said housing into the annuli of said second gears, and a pair of oppositely directed ratchet means each operatively connecting one of said second gears with said driven shaft means, whereby rotation of said first gear means in one direction causes one of said second gears to rotate said driven shaft means in predetermined direction through one of said ratchet means while the other of said ratchet means idles with respect to said driven shaft means, rotation of said first gear means in opposite direction causing said other ratchet means to rotate said driven shaft means in said predetermined direction.

2. A motor according to claim 1, including spring means opposing longitudinal displacement of said spindle means, whereby said longitudinal displacement is effected in one direction against the action of said spring means, the latter effecting return of said spindle means to initial position.

3. A motor according to claim 1, said first gear means comprising a pair of annular gears externally toothed and internally receiving said spindle means.

4. A hand powered motor for uni-directional implements and accessories, comprising a housing, a pair of spindles extending exteriorly of said housing and mounted for longitudinal movement therewithin, said spindles being provided with helical cam groove tracks, a pair of first annular gear means rotatably supported within said housing and provided with internal toothed means engaging said tracks of said spindles, respectively, whereby longitudinal movement of said spindles produces rotary motion of said gear means, respectively, driven shaft means extending exteriorly of said housing, a pair of second annular gear means mounted about said shaft means within said housing and operatively connected with said first gear means, respectively, a pair of oppositely biased ratchet means operatively connecting said second gear means with said shaft means, and spring means opposing longitudinal movement of said spindles, whereby upon moving said spindles longitudinally against the action of said spring means said first and said second gear means are rotated, one of said ratchet means idling while the other causes rotation of said shaft means in predetermined direction, release of said spindle means causing rotation of said first and second gear means in opposite direction, said other ratchet means idling while said one ratchet means causes further rotation of said shaft means in said predetermined direction.

5. A motor according to claim 4, including handle means disposed exteriorly of said housing and connecting said spindles, said housing being provided with an aperture, whereby said spindles may be actuated by an operator whose fingers extend through said aperture and whose palm extends over said handle means.

6. A motor according to claim 4, further including a pair of third gear means disposed intermediate said first and second gear means, respectively, for speeding up said second gear means.

7. A motor according to claim 4, including locking means disposed on said shaft means exteriorly of said housing, whereby said motor may be coupled with an implement for rotation thereof.

References Cited in the file of this patent

UNITED STATES PATENTS

| | | |
|---|---|---|
| 587,198 | Gilroy | July 27, 1897 |
| 857,527 | Lewis | June 18, 1907 |
| 1,683,871 | Curtis | Sept. 11, 1928 |
| 2,229,250 | McRae | Jan. 21, 1941 |
| 2,311,879 | Schultz | Feb. 23, 1943 |
| 2,388,486 | Lederman | Nov. 6, 1945 |
| 2,474,377 | Shurtleff | June 28, 1949 |
| 2,496,972 | Wolfe | Feb. 7, 1950 |
| 2,521,816 | Adams | Sept. 12, 1950 |
| 2,597,971 | Burnham | May 27, 1952 |
| 2,646,687 | De Wald | July 28, 1953 |